United States Patent
Lin (10) Patent No.: US 12,363,713 B2
(45) Date of Patent: Jul. 15, 2025

(54) USER EQUIPMENT AND SIDELINK RESOURCE SELECTION METHOD

(71) Applicant: GUANGDONG OPPO MOBILE TELECOMMUNICATIONS CORP., LTD., Dongguan (CN)

(72) Inventor: Huei-Ming Lin, Taipei (TW)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 466 days.

(21) Appl. No.: 17/959,114

(22) Filed: Oct. 3, 2022

(65) Prior Publication Data

US 2023/0026589 A1 Jan. 26, 2023

Related U.S. Application Data

(63) Continuation of application No. PCT/CN2021/085128, filed on Apr. 1, 2021.

(60) Provisional application No. 63/011,642, filed on Apr. 17, 2020.

(51) Int. Cl.
  *H04W 72/20* (2023.01)
(52) U.S. Cl.
  CPC .................... *H04W 72/20* (2023.01)
(58) Field of Classification Search
  CPC .................................................. H04W 72/20
  See application file for complete search history.

(56) References Cited

U.S. PATENT DOCUMENTS

2019/0159174 A1  5/2019  Seo

FOREIGN PATENT DOCUMENTS

| CN | 110089173 A | 8/2019 |
|---|---|---|
| CN | 110351858 A | 10/2019 |
| CN | 110679190 A | 1/2020 |
| CN | 110876202 A | 3/2020 |
| CN | 110892765 A | 3/2020 |
| WO | 2016163972 A1 | 10/2016 |
| WO | 2018074874 A1 | 4/2018 |
| WO | 2020017939 A1 | 1/2020 |

(Continued)

OTHER PUBLICATIONS

MediaTek Inc. "On sidelink mode-2 resource allocation"; 3GPP TSG RAN WG1 Meeting #100, e-meeting, Feb. 24-Mar. 6, 2020, R1-2000447 (Year: 2020).*

(Continued)

*Primary Examiner* — Joseph A Bednash
(74) *Attorney, Agent, or Firm* — BAYES PLLC (57) ABSTRACT

A user equipment (UE) and a sidelink resource selection method are provided. The sidelink resource selection method includes performing re-selection for a pre-selected resource indicated for re-evaluation and to be re-selected within 31 slots from another resource, such that a resource can be indicated by a sidelink control information (SCI), and a pre-selected resource is a resource of a selected sidelink grant which has not been identified by a prior SCI. This can solve issues in the prior art, reduce processing complexity, avoid delaying (re)transmissions of data transport block, avoid a complicated resource re-evaluation and/or re-selection, provide a good communication performance, and/or provide high reliability.

15 Claims, 2 Drawing Sheets

(56) References Cited

FOREIGN PATENT DOCUMENTS

WO    2020063327 A1    4/2020
WO    2020063403 A1    4/2020

OTHER PUBLICATIONS

LG Electronics, "Summary of RAN1 Agreements/Working assumptions in W1 5G V2X with NR sidelink", 3GPP TSG-RAN WG1 #99, Reno, USA, Nov. 18-22, 2019, R1-1913601 (Year: 2019).*

International Search Report and the Written Opinion dated Jun. 23, 2021 from the International Searching Authority Re. Application No. PCT/CN2021/085128.

Ericsson, "Resource allocation for Mode-2 transmissions", R1-1912599, 3GPP TSG-RAN WG1 Meeting #99 Reno, NV, US 18th-22nd 2019, Nov. 8, 2019 (Nov. 8, 2019), the whole document.

Oppo, "Discussions on resource reservation, sensing and selection in Mode 2", R1-1910379, 3GPP TSG-RAN WG1 Meeting #98bis Chongqing, China, Oct. 14-20, 2019, Oct. 8, 2019 (Oct. 8, 2019), the whole document.

The supplementary European search report dated Aug. 18, 2023 from European patent Application No. 21788687.8.

Mediatek Inc, "On sidelink mode-2 resource allocation", 3GPP Draft; R1-2000447, 3rd Generation Partnership Project (3GPP), Mobile Competence Centre ; 650, Route Des Lucioles ; F-06921 Sophia-Antipolis Cedex ; France, vol. RAN WG1, No. e-Meeting; Feb. 24, 2020-Mar. 6, 2020, Feb. 15, 2020 (Feb. 15, 2020).

LG Electronics, "Summary of RAN1 Agreements/Working assumptions in WI 5G V2X with NR sidelink", 3GPP Draft; R1-1913601, 3rd Generation Partnership Project (3GPP), Mobile Competence Centre ; 650, Route Des Lucioles ; F-06921 Sophia-Antipolis Cedex; FRANCE, vol. RAN WG1, No. Reno, USA; Nov. 18, 2019-Nov. 22, 2019, Jan. 7, 2020 (Jan. 7, 2020).

Apple, "On Remaining Details of Resource Allocation for Mode 2", 3GPP Draft; R1-2002325, 3rd Generation Partnership Project (3GPP), Mobile Competence Centre ; 650, Route Des Lucioles ; F-06921 Sophia-Antipolis Cedex ; France, vol. RAN WG1, No. e-Meeting; Apr. 20, 2020-Apr. 30, 2020, Apr. 11, 2020 (Apr. 11, 2020).

The First Office Action dated May 1, 2024 from Chinese patent application No. 202211567563.X.

Intel Corporation, "Design of Resource Allocation Mode-2 for NR V2X Sidelink Communication", 3GPP TSG RAN WG1 Meeting #99; R1-1912205, Nov. 9, 2019.

The Second Office Action dated Jul. 16, 2024 from Chinese patent application No. 202211567563.X.

The Notice of Allowance dated Sep. 20, 2024 from Chinese patent application No. 202211567563.X.

* cited by examiner

USER EQUIPMENT AND SIDELINK RESOURCE SELECTION METHOD

CROSS-REFERENCE TO RELATED APPLICATIONS

This application is a continuation of International Application No. PCT/CN2021/085128, filed on Apr. 1, 2021, entitled "USER EQUIPMENT AND SIDELINK RESOURCE SELECTION METHOD", which claims the benefit of priority to U.S. provisional Application No. 63/011,642, filed on Apr. 17, 2020, both of which are incorporated herein by reference in their entireties.

TECHNICAL FIELD

The present disclosure relates to the field of communication systems, and more particularly, to user equipment (UE) and a sidelink resource selection method, which can provide a good communication performance and/or provide high reliability.

BACKGROUND

In the development of a new sidelink (SL) transmission system based on the latest 5th generation-new radio (5G-NR) mobile technology for vehicle-to-everything (V2X) radio communication directly between user equipments (UEs), one of the most challenging tasks in the design is supporting UEs to operate autonomously almost entirely on its own with minimum (pre-)configurations and sometimes without any assistance from a mobile network. That is, for any SL UE to operate in this autonomous mode (as known as mode 2), it can detect and decode each other's messages, and select resources individually to transmit its own message to others while meeting the required performance in reliability and latency.

However, when there are many UEs operating SL communications at the same time and sharing the same radio carrier and mode 2 resource pool, it is difficult to avoid transmission (Tx) collisions among the UEs and maintaining the required target performance. Furthermore, due to the nature of UE autonomous selection of SL resources in mode 2, it is possible for UEs to announce and reserve one or more resource(s) in advance for their own future transmissions. Therefore, for a SL transmission UE (Tx-UE) to select appropriate resources and/or avoid selecting resource that have already been reserved by others, the Tx-UE needs to sense/monitor resource allocation information sent from others during a sensing window and exclude SL resources from a set of candidate resources set before selection.

In current resource selection methods, if all pre-selected resources that are still in a candidate resource set and to be re-selected together with affected resources, it is very likely that new/replacement resources different from the original ones will be selected and shifted to a later transmission timing. As such, when a re-evaluation process is triggered again at a later timing, a selection window will be also shifted to a later time. And if a resource (re)selection procedure is triggered again, then the whole resource re-selection starts over again and selection window shifting will happen again. Potentially, this could be a never-ending process until the remaining packet delay budget runs out for an initial transmission of transport block (TB). This can potentially degrade SL transmission performance significantly from not providing enough retransmissions of the same TB causing reliability issue and severely delays delivery of data packets resulting long latency issue.

Therefore, there is a need for a user equipment (UE) and a sidelink resource selection method, which can solve issues in the prior art, reduce processing complexity, avoid delaying (re)transmissions of data transport block, avoid a complicated resource re-evaluation and/or re-selection, provide a good communication performance, and/or provide high reliability.

SUMMARY

An object of the present disclosure is to propose a user equipment (UE) and a sidelink resource selection method, which can solve issues in the prior art, reduce processing complexity, avoid delaying (re)transmissions of data transport block, avoid a complicated resource re-evaluation and/or re-selection, provide a good communication performance, and/or provide high reliability.

In a first aspect of the present disclosure, a user equipment (UE) includes a memory, a transceiver, and a processor coupled to the memory and the transceiver. The processor is configured to perform re-selection for a pre-selected resource indicated for re-evaluation and to be re-selected within 31 slots from another resource, such that a resource can be indicated by a sidelink control information (SCI), and a pre-selected resource is a resource of a selected sidelink grant which has not been identified by a prior SCI.

In a second aspect of the present disclosure, a sidelink resource selection method of a user equipment includes performing re-selection for a pre-selected resource indicated for re-evaluation and to be re-selected within 31 slots from another resource, such that a resource can be indicated by a sidelink control information (SCI), and a pre-selected resource is a resource of a selected sidelink grant which has not been identified by a prior SCI.

In a third aspect of the present disclosure, a non-transitory machine-readable storage medium has stored thereon instructions that, when executed by a computer, cause the computer to perform the above method.

In a fourth aspect of the present disclosure, a chip includes a processor, configured to call and run a computer program stored in a memory, to cause a device in which the chip is installed to execute the above method.

In a fifth aspect of the present disclosure, a computer readable storage medium, in which a computer program is stored, causes a computer to execute the above method.

In a sixth aspect of the present disclosure, a computer program product includes a computer program, and the computer program causes a computer to execute the above method.

In a seventh aspect of the present disclosure, a computer program causes a computer to execute the above method.

BRIEF DESCRIPTION OF THE DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

According to a current sidelink (SL) resource (re)selection procedure in mode 2, it comprises two main steps as:
Step 1:
A Tx-UE performs monitoring of slots in a sensing window to obtain from other UEs allocation and reservation information of future SL resources, and formulates a candidate resource set ($S_A$) from which the Tx-UE can select SL resources for its own transmissions by excluding resources according to certain criteria. For example, resources that are already reserved/announced by other UEs, periodic resources correspond to slots that are not monitored by the Tx-UE, etc.
Step 2:
The Tx-UE performs an actual selection or re-selection within a selection time window (between $n+T_1$ and $n+T_2$) of new or replacement SL resource(s) that may have been pre-empted or reserved/announced by another UE before the Tx-UE had a chance to reserve it, where time n is the resource (re)selection triggering time/slot.

Triggering of the above resource (re)selection procedure can be based on arrival of data transport block (TB) from higher layer, detection of resource pre-emption, and/or re-evaluation of pre-selected resources, where the pre-selected resources are resources that are already previously selected by the Tx-UE (e.g., at time of data TB arrival) yet to be first time signaled/announced in sidelink control information (SCI). When the resource (re)selection procedure is triggered by the re-evaluation, it needs to be carried out at least at time '$m-T_3$' before the pre-selected resource(s) is first time signaled/announced in SCI at time/slot m, where $T_3$ is the time required for the Tx-UE to perform the resource (re)selection procedure (Step 1 and Step 2). It is understood that during Step 1, if any of pre-selected resources to be first time signaled/announced is no longer in the candidate resource set ($S_A$), Step 2 is carried out to perform re-selection. It is further understood that when Step 2 is triggered, all other pre-selected resources that are still part of the candidate resource set ($S_A$) (e.g., not reserved/announced by other UEs) can be also re-selected.

To this end, if all pre-selected resources that are still in the set $S_A$ (e.g., non-affected/not taken over by another UE) and to be re-selected together with affected resources, it is very likely that new/replacement resources different from the original ones will be selected and shifted to a later transmission timing. As such, when the re-evaluation process is triggered again at a later timing (i.e., again at time/slot '$m-T_3$' before the first newly selected resources), the selection window will be also shifted to a later time. And if Step 2 is triggered again, then the whole resource re-selection starts over again and selection window shifting will happen again. Potentially, this could be a never-ending process until the remaining packet delay budget runs out for the initial transmission of the TB. This can potentially degrade SL transmission performance significantly from not providing enough retransmissions of the same TB causing reliability issue and severely delays delivery of data packets resulting long latency issue.

In some embodiments of the present disclosure, a simple method for resource re-selection, primarily intended for new radio-sidelink (NR-SL) communication is provided. In some embodiments, a transmission user equipment (Tx-UE) re-selects a sidelink (SL) resource to replace an already announced/reserved or pre-selected resource on a need-only basis to minimize processing complexity and to avoid delaying (re)transmissions of data transport block as described earlier due to the resource re-evaluation process. By performing SL re-selection for resources that are affected by pre-emption and/or reservation from another UE, it allows the Tx-UE to be able to transmit sidelink control information (SCI) via physical sidelink control channel (PSCCH) and reserve subsequent resources as planned without delay when a first pre-selected resource in the re-evaluation process is not affected. When the first pre-selected resource is affected and needs to be re-selected, it is also proposed to select/prioritize the earliest or one of earlier resources from a candidate resource set (SA) for selection, so that the Tx-UE can transmit the data TB as quick as possible.

Figure 1:
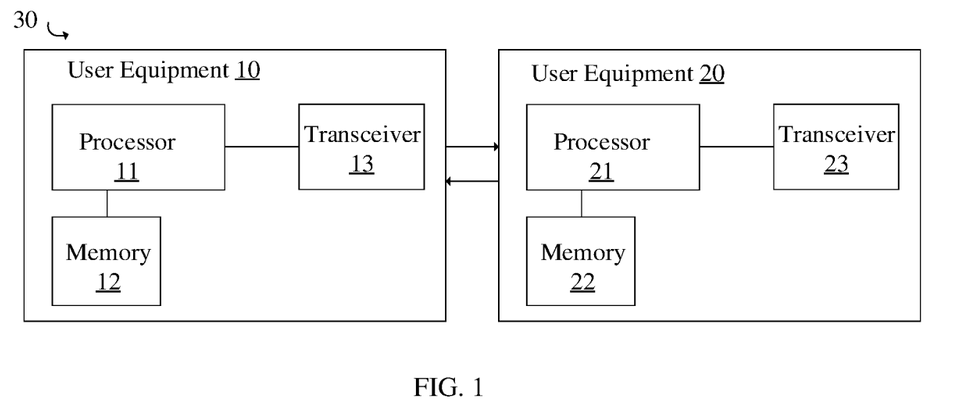
FIG. 1 is a block diagram of user equipments (UEs) of communication in a communication network system according to an embodiment of the present disclosure.

FIG. 1 illustrates that, in some embodiments, one or more user equipments (UEs) 10 and one or more user equipments (UEs) 20 of communication in a communication network system 30 according to an embodiment of the present disclosure are provided. The communication network system 30 includes one or more UEs 10 and one or more UE 20. The UE 10 may include a memory 12, a transceiver 13, and a processor 11 coupled to the memory 12 and the transceiver 13. The UE 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 16 and beyond. UEs are communicated with each other directly via a sidelink interface such as a PC5 interface. Some embodiments of the present disclosure relate to sidelink communication technology in 3GPP NR release 16 and beyond. Some embodiments of the present disclosure relate to mobile cellular communication technology in 3GPP NR Release 16 and beyond for providing multicast and broadcast services.

In some embodiments, the UE 10 may be a sidelink packet transport block (TB) transmission UE (Tx-UE). The UE 20 may be a sidelink packet TB reception UE (Rx-UE) or a peer UE. The sidelink packet TB Rx-UE can be configured to send ACK/NACK feedback to the packet TB Tx-UE. The peer UE 20 is another UE communicating with the Tx-UE 10 in a same SL unicast or groupcast session.

In some embodiments, the processor 11 is configured to perform re-selection for a pre-selected resource indicated for re-evaluation and to be re-selected within 31 slots from another resource, such that a resource can be indicated by a sidelink control information (SCI), and a pre-selected resource is a resource of a selected sidelink grant which has not been identified by a prior SCI. In another example, the pre-selected resource is the resource of the selected sidelink grant for a medium access control protocol data unit (MAC PDU) that has not been identified by the prior SCI. This can solve issues in the prior art, reduce processing complexity, avoid delaying (re)transmissions of data transport block, avoid a complicated resource re-evaluation and/or re-selection, provide a good communication performance, and/or provide high reliability.

Figure 2:
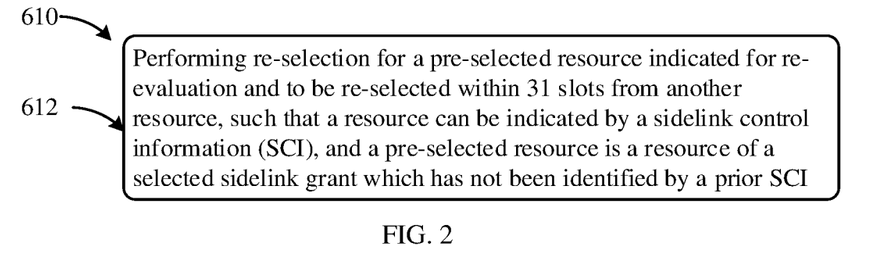
FIG. 2 is a flowchart illustrating a sidelink resource selection method of a UE according to an embodiment of the present disclosure.

FIG. 2 illustrates a sidelink resource selection method 610 of a user equipment according to an embodiment of the present disclosure. In some embodiments, the method 610 includes: a block 612, performing re-selection for a pre-selected resource indicated for re-evaluation and to be re-selected within 31 slots from another resource, such that a resource can be indicated by a sidelink control information (SCI), and a pre-selected resource is a resource of a selected sidelink grant which has not been identified by a prior SCI. In another example, the pre-selected resource is the resource of the selected sidelink grant for a medium access control protocol data unit (MAC PDU) that has not been identified by the prior SCI. This can solve issues in the prior art, reduce processing complexity, avoid delaying (re)transmissions of data transport block, avoid a complicated resource re-evaluation and/or re-selection, provide a good communication performance, and/or provide high reliability.

In some embodiments, the resource that can be indicated by the SCI includes the pre-selected resource, a re-selected resource for the resource indicated for re-evaluation, and a reserved resource which has been identified by a prior SCI. In some embodiments, the UE 10 is configured to perform re-selection for a resource indicated for re-evaluation and to be re-selected within 31 slots from another resource, wherein the resource indicated for re-evaluation is indicated by a sidelink control information (SCI), and a pre-selected resource is a resource of a selected sidelink grant for a medium access control protocol data unit (MAC PDU) that has not been identified by a prior SCI. In some embodiments, if a first pre-selected resource is to be re-selected from a candidate resource set, the first pre-selected resource to be re-selected is selected from an earlier resource of the candidate resource set, and the earlier resource is a resource from a first slot or an earliest resource of the candidate resource set. In some embodiments, a number of pre-selected resources for re-evaluation is limited according to a configured maximum number associated with a number of intended resources to be indicated by a SCI. In some embodiments, the UE 10 is configured to perform the re-selection for the resource indicated for re-evaluation in a resource selection window.

In some embodiments, a length of a resource selection window comprises T2 min slots. In some embodiments, a length of a resource selection window comprises at least 38 slots or T2 min slots, whichever is smaller. In some embodiments, when one or more of pre-selected resources are no longer in the candidate resource set and a resource re-selection is triggered, the UE 10 performs the resource re-selection for the one or more of pre-selected resources that are indicated for re-evaluation. In some embodiments, a resource re-selection is not performed for pre-selected resources that are still in the candidate resource set. In some embodiments, pre-selected resources for re-evaluation comprise the first pre-selected resource and a second pre-selected resource.

In some embodiments, when one or more of the first pre-selected resource and the second pre-selected resource are indicated for re-evaluation and a resource re-selection process is triggered, the UE 10 re-selects the one or more of the first pre-selected resource and the second pre-selected resource to be re-selected from the candidate resource set, and the one or more of the first pre-selected resource and the second pre-selected resource to be re-selected from the candidate resource set within 31 slots from a pre-selected resource and/or a re-selected resource. In some embodiments, when the first pre-selected resource is indicated for re-evaluation and a resource re-selection process is triggered, the UE 10 re-selects an available resource from the candidate resource set, and the available resource is within 31 slots from the second pre-selected resource. In some embodiments, when the first pre-selected resource is indicated for re-evaluation and a resource re-selection process is triggered, the UE 10 re-selects an earlier resource from the candidate resource set, and the earlier resource is within 31 slots from the second pre-selected resource.

In some embodiments, when the second pre-selected resource is indicated for re-evaluation and a resource re-selection process is triggered, the UE 10 re-selects an available resource from the candidate resource set, and the available resource is within 31 slots from the first pre-selected resource. In some embodiments, when the second pre-selected resource is indicated for re-evaluation, there is a next pre-selected resource after the second pre-selected resource, and a resource re-selection process is triggered, the UE 10 re-selects a new/re-selected resource within 31 slots from the next pre-selected resource. In some embodiments, when the first pre-selected resource and the second pre-selected resource are indicated for re-evaluation and a resource re-selection process is triggered, the UE 10 re-selects two available resources from the candidate resource set in slots that are not more than 31 slots apart. In some embodiments, when the first pre-selected resource and the second pre-selected resource are indicated for re-evaluation and a resource re-selection process is triggered, the UE 10 re-selects a first re-selected resource that is earlier from the candidate resource set and re-selects a second re-selected resource that is not more than 31 slots from the first re-selected resource.

In some embodiments, pre-selected resources for re-evaluation comprise a first pre-selected resource, a second pre-selected resource, and a third pre-selected resource. In some embodiments, when one or more of the first pre-selected resource, the second pre-selected resource, and the third pre-selected resource are indicated for re-evaluation and a resource re-selection process is triggered, the UE 10 re-selects the one or more of the first pre-selected resource, the second pre-selected resource, and the third pre-selected resource to be re-selected from the candidate resource set, and the one or more of the first pre-selected resource, the second pre-selected resource, and the third pre-selected resource to be re-selected from the candidate resource set within 31 slots from a pre-selected resource and/or a re-selected resource. In some embodiments, when the first pre-selected resource is indicated for re-evaluation and a resource re-selection process is triggered, the UE 10 re-selects an available resource from the candidate resource set, and the available resource is within a maximum of 31 slots from the second pre-selected resource. In some embodiments, when the first pre-selected resource is indicated for re-evaluation and a resource re-selection process is triggered, the UE 10re-selects an earlier resource from the candidate resource set, and the earlier resource is within a maximum of 31 slots from the second pre-selected resource.

In some embodiments, for the present disclosed resource re-selection method for NR-SL communication, it is proposed to adopt one or more of the followings during the resource re-evaluation process.

1. Re-selection process: The UE selects a resource to be re-selected within 31 slots from an adjacent pre-selected resource and/or an adjacent re-selected resource, such that pre-selected and re-selected resources are signaled and/or reserved by a prior transmission.

2. Limiting a number of pre-selected resources for re-evaluation according to a (pre-)configured maximum number Nmax, a number of intended resources to be signaled/reserved by SCI in slot m (i.e., 2 or 3). This avoids a complicated resource re-evaluation and/or re-selection process/keep complexity of the resource re-evaluation and re-selection process to a minimum. Early re-evaluation of resources that are not to be signaled immediate would not bring much benefit as these resources would still be exposed and subject to resource announcement/reservation from another UE.

3. A length of selection window (SW) comprises at least 38 slots or Tamm slots (whichever is smaller). This ensures there is sufficient number of remaining candidate resources that can be selected from, and this avoids incremental increase of reference signal received power (RSRP) threshold in order to reach 20% of total resources within the selection window.

When one or more of pre-selected resources are no longer in the candidate resource set ($S_A$) and Step 2 (resource re-selection step) is triggered, the UE performs resource re-selection for ones that are no longer in the set $S_A$. That is, no re-selection for pre-selected resources that are still in the candidate set $S_A$. This avoids re-selection of the first resource if there is no need to and thus minimizing the risk of selection window shifting for the same (re)transmission of a TB.

Figure 3:
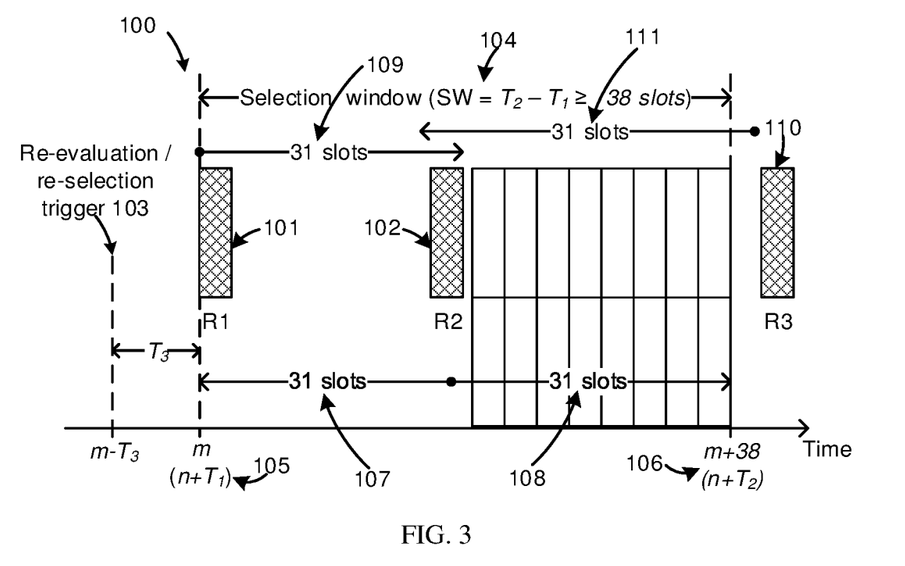
FIG. 3 is a schematic diagram illustrating an exemplary illustration of a proposed resource re-selection method when a number of pre-selected resources for re-evaluation is 2 according to an embodiment of the present disclosure.

Re-Selection Process:

FIG. 3 illustrates an exemplary illustration of a proposed resource re-selection method when a number of pre-selected resources for re-evaluation is 2 according to an embodiment of the present disclosure. In reference to diagram 100 in FIG. 3, an exemplary illustration of the proposed resource re-selection scheme is depicted for the case when the number of pre-selected resources for re-evaluation is 2, namely a resource R1 101 and a resource R2 102. As described previously in some embodiments, the resource re-evaluation process is triggered at least at time 'm−$T_3$' before the resource that is first time signaled/announced. In this case, it is at time 103 before the resource R1 101. Once the re-evaluation/re-selection is triggered at the time 103, a Tx-UE determines a selection window from time n+$T_1$ to time n+$T_2$, where n is referred as resource re-selection process trigger timing. According to the above some embodiments for the proposed resource re-selection method, a length of the selection window comprises $T_{2min}$ slots. Optionally, in another example, the length of the selection window comprises at least 38 slots or $T_{2min}$ slots (whichever is smaller). Let's assume in this case $T_{2min}$>38 slots, and therefore, the selection window (SW) length may be at least 38 slots 104 from a time slot m 105 to a time slot m+38 106. Then, a candidate resource set $S_A$ for the Tx-UE to re-select a replacement resource from would be also cover from time n+$T_1$=m to time n+$T_2$=m+38.

FIG. 3 illustrates that, in some embodiments, if the first pre-selected resource R1 101 needs to be re-selected by the Tx-UE (due to no longer in the candidate resource set $S_A$) and resource (re)selection Step 2 is triggered, the Tx-UE re-selects any available resource from the candidate resource set that is within 31 slots 107 and 108 from the second pre-selected resource R2 102, or an earlier/earliest resource from the candidate resource set and still within 31 slots 107 from the second pre-selected resource R2 102.

FIG. 3 illustrates that, in some embodiments, if the second pre-selected resource R2 102 needs to be re-selected by the Tx-UE (due to no longer in the candidate resource set $S_A$) and resource (re) selection Step 2 is triggered, the Tx-UE re-selects any available resource from the candidate resource set that is within 31 slots 109 from the first pre-selected resource R1 101. If there is already a next pre-selected resource R3 110 after the second resource, then the newly/re-selected resource also needs to be within 31 slots 111 from the next pre-selected resource R3 110.

FIG. 3 illustrates that, in some embodiments, if both pre-selected resources R1 101 and R2 102 need to be re-selected by the Tx-UE (due to no longer in the candidate resource set $S_A$) and resource (re) selection Step 2 is triggered, the Tx-UE randomly re-selects 2 resources from the candidate resource set in slots that are not more than 31 slots apart. Alternatively, re-select a first resource that is earlier/earliest from the candidate resource set and re-select a second resource that is not more than 31 slots from the first re-selected resource.

Figure 4:
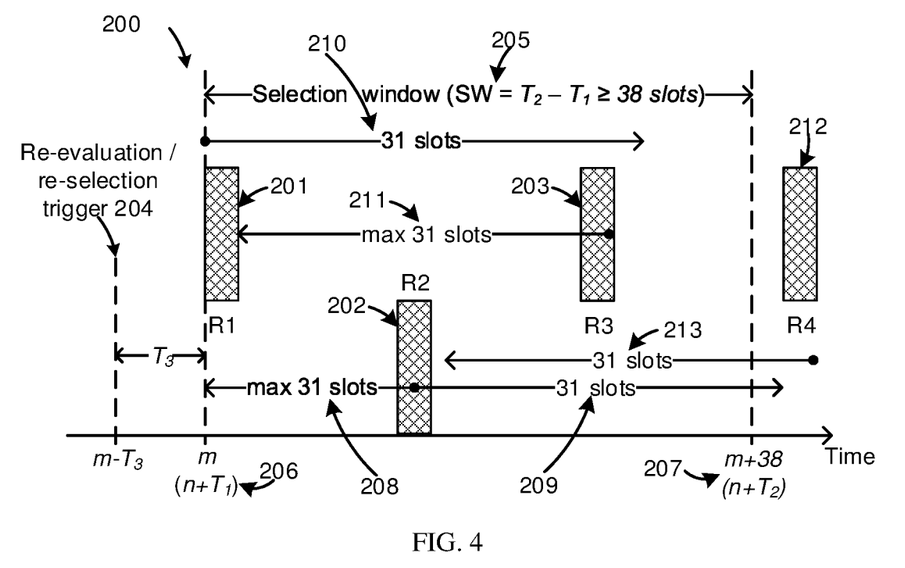
FIG. 4 is a schematic diagram illustrating an exemplary illustration of a proposed resource re-selection method when a number of pre-selected resources for re-evaluation is 3 according to an embodiment of the present disclosure.

FIG. 4 illustrates an exemplary illustration of a proposed resource re-selection method when a number of pre-selected resources for re-evaluation is 3 according to an embodiment of the present disclosure. In reference to diagram 200 in FIG. 4, an exemplary illustration of the proposed resource re-selection scheme is depicted for the case when the number of pre-selected resources for re-evaluation is 3, namely a resource R1 201, a resource R2 202, and a resource R3 203. As described previously in some embodiments, the resource re-evaluation process is triggered at least at time 'm−$T_3$' before the resource that is first time signaled/announced. In this case, it is at time (204) before the resource R1 201. In some embodiments, once the re-evaluation/re-selection is triggered at the time 204, the Tx-UE determines a selection window from time n+$T_1$ to time n+$T_2$, where n is referred as the resource re-selection process trigger timing. According to the above some embodiments for the proposed resource re-selection method, a length of the selection window comprises $T_{2min}$ slots. Optionally, in another example, the length of the selection window comprises at least 38 slots or $T_{2min}$ slots (whichever is smaller). Let's assume in this case $T_{2min}$>38 slots, and therefore, the selection window (SW) length is at least 38 slots 205 from a time slot m 206 to a time slot m+38 207. Then, a candidate resource set $S_A$ for the Tx-UE to re-select a replacement resource from would be also cover from time n+$T_1$=m to time n+$T_2$=m+38.

FIG. 4 illustrates that, in some embodiments, if the first pre-selected resource R1 201 needs to be re-selected by the Tx-UE (due to no longer in the candidate resource set $S_A$) and resource (re) selection Step 2 is triggered, the Tx-UE re-selects any available resource from the candidate resource set that is within a maximum of 31 slots 208 and 209 from the second pre-selected resource R2 202, or an earlier/earliest resource from the candidate resource set and still within a maximum of 31 slots 208 from the second pre-selected resource R2 202.

FIG. 4 illustrates that, in some embodiments, if only the second pre-selected resource R2 (202) needs to be re-selected by the Tx-UE (due to no longer in the candidate resource set $S_A$) and resource (re) selection Step 2 is triggered, the Tx-UE re-selects any available resource from the candidate resource set that is within 31 slots 210 and 211 from the first pre-selected resource R1 201 and the third pre-selected resource R3 203, respectively.

FIG. 4 illustrates that, in some embodiments, if the third pre-selected resource R3 203 needs to be re-selected by the Tx-UE (due to no longer in the candidate resource set $S_A$) and resource (re) selection Step 2 is triggered, the Tx-UE re-selects any available resource from the candidate resource set that is within 31 slots 209 from the second pre-selected resource R2 202. If there is already a next pre-selected resource R4 212 after the third resource R3 (203), then the newly/re-selected resource also needs to be within 31 slots 213 from the next pre-selected resource R4 212.

FIG. 4 illustrates that, in some embodiments, if the first pre-selected resource R1 201 and the second pre-selected resource R2 202 need to be re-selected by the Tx-UE (due to no longer in the candidate resource set $S_A$) and resource (re) selection Step 2 is triggered, the Tx-UE re-selects an earlier/earliest resource from the candidate resource set for the first re-selected resource and re-selects any available resource from the candidate resource set that is within 31 slots from the first re-selected resource R1 201 and the third pre-selected resource R3 203.

FIG. 4 illustrates that, in some embodiments, if the second pre-selected resource R2 202 and the third pre-selected resource R3 203 need to be re-selected by the Tx-UE (due to no longer in the candidate resource set $S_A$) and resource (re) selection Step 2 is triggered, the Tx-UE re-selects any 2 available resources from the candidate resource set that are within 31 slots from one another. Additionally, the first re-selected resource to replace the second pre-selected resource R2 202 are within 31 slots from the first pre-selected resource R1 201. If there is already a next pre-selected resource R4 212 after the third pre-selected resource R3 203, then the second re-selected resource to replace the third pre-selected resource R3 203 is within 31 slots 213 from the next pre-selected resource R4 212.

FIG. 4 illustrates that, in some embodiments, if the first pre-selected resource R1 201 and the third pre-selected resource R3 203 need to be re-selected by the Tx-UE (due to no longer in the candidate resource set $S_A$) and resource (re) selection Step 2 is triggered, the Tx-UE re-selects an earlier/earliest resource from the candidate resource set that is within a maximum of 31 slots 208 from the second pre-selected resource R2 202 for the first re-selected resource to replace the first pre-selected resource R1 201. For the second re-selected resource to replace the third pre-selected resource R3 203, it is within 31 slots 208 and 209 from the second pre-selected resource R2 202. And if there is already a next pre-selected resource R4 212 after the third pre-selected resource R3 203, then the second re-selected resource to replace the third pre-selected resource R3 203 is also within 31 slots 213 from the next pre-selected resource R4 212.

In summary, some embodiments of the present disclosure provide one or more of the followings:

1. For any re-selected/replacement resource during the re-selection process, the re-selected resource is within 31 slots from its adjacent pre-selected and/or re-selected resource(s), to ensure all pre-selected and re-selected resources can be signaled/reserved by a prior transmission.

2. During the re-selection process, if the first pre-selected resource is to be re-selected from a candidate resource set, it is selected from an earlier/earliest resource of the candidate resource set, to ensure the first transmission is sent as early as possible, to reserve other selected resources as quickly as possible, and to minimize the chance of selection window shifting as described earlier.

3. Limiting number of pre-selected resources for re-evaluation according to a (pre-)configured maximum number Nmax, number of intended resources to be signaled/reserved by SCI in slot m (i.e., 2 or 3), to avoid a complicated resource re-evaluation and re-selection process/keep complexity of the resource re-evaluation and re-selection process to a minimum; early re-evaluation of resources that are not to be signaled immediate would not bring much benefit as these resources would still be exposed and subject to resource announcement/reservation from another UE.

4. The length of the selection window (SW) is $T_{2min}$ slots. In another example, the length of the selection window (SW) is at least 38 slots or $T_{2min}$ slots (whichever is smaller), to ensure there is sufficient number of remaining candidate resources that can be selected from and to avoid incremental increase of reference signal received power (RSRP) threshold in order to reach 20% of total resources within the selection window.

5. When one or more of pre-selected resources are no longer in the candidate resource set ($S_A$) and Step 2 (resource re-selection step) is triggered, the UE performs resource re-selection for ones that are no longer in the set $S_A$. That is, no re-selection for pre-selected resources that are still in the candidate set $S_A$, to avoid re-selection of the first resource if there is no need to and thus minimizing the risk of selection window shifting for the same (re)transmission of a TB.

Commercial interests for some embodiments are as follows. 1. Solving issues in the prior art. 2. Reducing processing complexity. 3. Avoiding delaying (re)transmissions of data transport block. 4. Avoiding a complicated resource re-evaluation and/or re-selection. 5. Providing good communication performance. 6. Providing high reliability. 7. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product.

Figure 5:
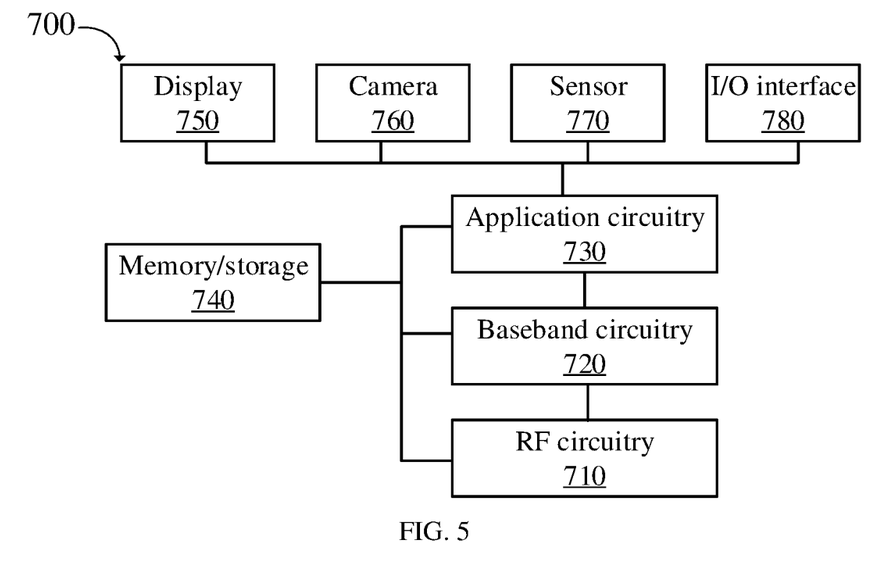
FIG. 5 is a block diagram of a system for wireless communication according to an embodiment of the present disclosure.

FIG. 5 is a block diagram of an example system 700 for wireless communication according to an embodiment of the present disclosure. Embodiments described herein may be implemented into the system using any suitably configured hardware and/or software. FIG. 5 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment (UE), comprising:
a memory;
a transceiver; and
a processor coupled to the memory and the transceiver;
wherein the processor is configured to perform re-selection for a pre-selected resource indicated for re-evaluation and to be re-selected within 31 slots from another resource, such that a re-selected resource after the re-selection is indicated by a prior sidelink control information (SCI), or a next resource is indicated by a SCI;
wherein the pre-selected resource is a resource of a selected sidelink grant which has not been identified by the prior SCI,
when one or more of pre-selected resources are no longer in a candidate resource set and a resource re-selection is triggered, the processor performs the resource re-selection for the one or more of pre-selected resources that are indicated for re-evaluation.

2. The UE of claim 1, wherein if a first pre-selected resource is to be re-selected from the candidate resource set, the first pre-selected resource to be re-selected is selected from an earlier resource of the candidate resource set;
wherein the earlier resource is a resource from a first slot or an earliest resource of the candidate resource set.

3. The UE of claim 1, wherein a number of pre-selected resources for re-evaluation is limited according to a configured maximum number associated with a number of intended resources to be indicated by a SCI.

4. The UE of claim 1, wherein a resource selection window is from $(n+T_1)$ to $(n+T_2)$, n is referred as resource re-selection process trigger timing, and
a length of the resource selection window comprises at least 38 slots or $T_{2min}$ slots, whichever is smaller, $T_{2min}$ being a minimum value of $T_2$.

5. The UE of claim 1, wherein the resource re-selection is not performed for pre-selected resources that are still in the candidate resource set.

6. A sidelink resource selection method by a user equipment (UE), comprising:
performing re-selection for a pre-selected resource indicated for re-evaluation and to be re-selected within 31 slots from another resource, such that a re-selected resource after the re-selection is indicated by a prior sidelink control information (SCI), or a next resource is indicated by a SCI, and the pre-selected resource is a resource of a selected sidelink grant which has not been identified by the prior SCI,
when one or more of pre-selected resources are no longer in a candidate resource set and a resource re-selection is triggered, the processor performs the resource re-selection for the one or more of pre-selected resources that are indicated for re-evaluation.

7. The method of claim 6, wherein if a first pre-selected resource is to be re-selected from the candidate resource set, the first pre-selected resource to be re-selected is selected from an earlier resource of the candidate resource set;
wherein the earlier resource is a resource from a first slot or an earliest resource of the candidate resource set.

8. The method of claim 6, wherein a number of pre-selected resources for re-evaluation is limited according to a configured maximum number associated with a number of intended resources to be indicated by a SCI.

9. The method of claim 6, wherein a resource selection window is from $(n+T_1)$ to $(n+T_2)$, n is referred as resource re-selection process trigger timing, and
a length of the resource selection window comprises at least 38 slots or $T_{2min}$ slots, whichever is smaller, $T_{2min}$ being a minimum value of $T_2$.

10. The method of claim 6, wherein the resource re-selection is not performed for pre-selected resources that are still in the candidate resource set.

11. A chip, comprising:
a processor, configured to call and run a computer program stored in a memory, to cause a device in which the chip is installed to perform:
re-selection for a pre-selected resource indicated for re-evaluation and to be re-selected within 31 slots from another resource, such that a re-selected resource after the re-selection is indicated by a prior sidelink control information (SCI), or a next resource is indicated by a SCI;
wherein the pre-selected resource is a resource of a selected sidelink grant which has not been identified by the prior SCI, when one or more of pre-selected resources are no longer in a candidate resource set and a resource re-selection is triggered, the processor performs the resource re-selection for the one or more of pre-selected resources that are indicated for re-evaluation.

12. The chip according to claim 11, wherein if a first pre-selected resource is to be re-selected from the candidate resource set, the first pre-selected resource to be re-selected is selected from an earlier resource of the candidate resource set;

wherein the earlier resource is a resource from a first slot or an earliest resource of the candidate resource set.

13. The chip according to claim 11, wherein a number of pre-selected resources for re-evaluation is limited according to a configured maximum number associated with a number of intended resources to be indicated by a SCI.

14. The chip according to claim 11, wherein a resource selection window is from $(n+T_1)$ to $(n+T_2)$, n is referred as resource re-selection process trigger timing, and a length of the resource selection window comprises at least 38 slots or $T_{2min}$ slots, whichever is smaller, $T_{2min}$ being a minimum value of $T_2$.

15. The chip according to claim 11, wherein the resource reselection is not performed for pre-selected resources that are still in the candidate resource set.

* * * * *